US012697921B2

(12) United States Patent
Bonner et al.

(10) Patent No.: US 12,697,921 B2
(45) Date of Patent: Aug. 4, 2026

(54) CARGO SHELF ASSEMBLY FOR A VEHICLE

(71) Applicant: American Honda Motor Co., Inc., Torrance, CA (US)

(72) Inventors: Roland Bonner, Marysville, OH (US); Kyle R. Harp, Cable, OH (US); Kris Lemmon, Shawnee Hills, OH (US); Edgar Martinez, Marysville, OH (US); Colin P. Gorey, Marysville, OH (US)

(73) Assignee: American Honda Motor Co., Inc., Torrance, CA (US)

( * ) Notice: Subject to any disclaimer, the term of this patent is extended or adjusted under 35 U.S.C. 154(b) by 372 days.

(21) Appl. No.: 18/593,705

(22) Filed: Mar. 1, 2024

(65) Prior Publication Data

US 2025/0276648 A1     Sep. 4, 2025

(51) Int. Cl.
B60R 5/04      (2006.01)
B60R 13/01     (2006.01)
B60R 11/00      (2006.01)

(52) U.S. Cl.
CPC ............ B60R 5/048 (2013.01); B60R 13/013 (2013.01); *B60R 2011/0071* (2013.01); *B60R 2011/0073* (2013.01)

(58) Field of Classification Search
CPC .................. B60R 5/048; B60R 13/013; B60R 2011/0071; B60R 2011/0073; B60R 5/003; B60R 5/044; B60R 5/045; B62D 33/042; B60N 3/001
USPC ........................ 296/37.1, 24.44, 24.43, 24.33
See application file for complete search history.

(56) References Cited

U.S. PATENT DOCUMENTS

| | | | | |
|---|---|---|---|---|
| 5,037,154 A | * | 8/1991 | Senba | ..................... B60R 5/044 |
| | | | | 296/37.16 |
| 5,080,417 A | | 1/1992 | Kanai | |
| 5,771,813 A | | 6/1998 | Jackson | |
| 5,992,331 A | | 11/1999 | Inoue et al. | |
| 7,628,439 B1 | | 12/2009 | Strong | |
| 7,661,742 B2 | * | 2/2010 | Medlar | ..................... B60R 5/04 |
| | | | | 296/37.16 |
| 8,424,946 B2 | | 4/2013 | Newberg et al. | |
| 10,017,099 B2 | | 7/2018 | Yilma et al. | |

(Continued)

FOREIGN PATENT DOCUMENTS

| | | | |
|---|---|---|---|
| DE | 4340675 A1 | 6/1995 | |
| DE | 19942530 A1 | 4/2001 | |

(Continued)

*Primary Examiner* — Vivek D Koppikar
*Assistant Examiner* — Daniel Guang-Dian Chen
(74) *Attorney, Agent, or Firm* — Suzanne Gagnon; American Honda Motor Co, Inc.

(57) ABSTRACT

A cargo shelf assembly for a vehicle includes a shelf adapted to be removably engaged with the vehicle to divide at least a part of a cargo space of the vehicle. The shelf includes a plurality of retention structures to facilitate a conversion of the shelf into a table upon removal of the shelf from the vehicle. The shelf assembly also includes a plurality of latches coupled to the shelf and adapted to move between an extended position and a retracted position. In the extended position, the plurality of latches facilitates an engagement of the shelf to the vehicle. In the retracted position, the plurality of latches enables a disengagement of the shelf from side liners of the vehicle.

19 Claims, 12 Drawing Sheets

(56) References Cited

U.S. PATENT DOCUMENTS

| 10,059,269 | B2 * | 8/2018 | Herman ............. B60R 13/0237 |
| 10,434,854 | B2 | 10/2019 | Yilma et al. |
| 11,084,428 | B2 | 8/2021 | Navarro et al. |
| 11,142,129 | B2 | 10/2021 | Howard, II et al. |
| 2006/0016840 | A1 * | 1/2006 | Svenson ................... B60R 5/04 |
| | | | 224/543 |
| 2018/0072208 | A1 * | 3/2018 | Howe .................... B60N 3/001 |
| 2019/0126836 | A1 * | 5/2019 | Navarro ................ B60R 5/045 |
| 2019/0202332 | A1 * | 7/2019 | Tovani .................. B60N 3/001 |
| 2022/0144352 | A1 * | 5/2022 | Nelson ................... A47B 3/10 |
| 2022/0194300 | A1 * | 6/2022 | Ritter ................... B60R 13/013 |

FOREIGN PATENT DOCUMENTS

| EP | 1447278 | A2 | 8/2004 |
| EP | 2495132 | A1 | 9/2012 |
| EP | 2620327 | B1 | 7/2015 |

* cited by examiner

CARGO SHELF ASSEMBLY FOR A VEHICLE

BACKGROUND

The disclosed subject matter relates generally to vehicles. More particularly, the disclosed subject matter relates to a removable cargo shelf for a cargo space of a vehicle.

Vehicles, such as hatchbacks, minivans, sports utility vehicles, etc., typically, include a cargo space arranged behind the rear seats that is generally visible from a rear windscreen of the vehicles. A cover assembly is generally mounted inside the vehicle to cover the cargo space from above. However, the existing cover assemblies are either fixedly mounted to the vehicle or are difficult to remove, which is undesirable.

SUMMARY

In accordance with one embodiment of the present disclosure, a cargo shelf assembly for a vehicle is disclosed. The cargo shelf assembly includes a shelf adapted to be removably engaged with the vehicle and to divide at least a part of a cargo space of the vehicle. The shelf assembly also includes a plurality of retention structures to facilitate a conversion of the shelf into a table upon removal of the shelf from the vehicle. The shelf assembly further includes a plurality of latches coupled to the shelf and adapted to move between an extended position and a retracted position. In the extended position, the plurality of latches facilitates an engagement of the shelf to the vehicle. In the retracted position, the plurality of latches enables a disengagement of the shelf from the vehicle.

In accordance with another embodiment of the present disclosure, a vehicle is provided. The vehicle includes a vehicle body defining a cargo space for storing one or more cargo and a shelf adapted to be removably engaged with the vehicle and to divide at least a part of the cargo space of the vehicle. The shelf includes a plurality of retention structures to facilitate a conversion of the shelf into a table upon removal of the shelf from the vehicle. The vehicle further includes a plurality of latches adapted to move between an extended position and a retracted position and coupled to the shelf. In the extended position, the plurality of latches engages the shelf with the vehicle body.

In accordance with yet a further embodiment of the present disclosure a shelf structure for a vehicle is disclosed. The shelf structure includes a shelf adapted to be removably engaged with the vehicle to divide at least a part of a cargo space of the vehicle and a plurality of retention structures. The shelf structure further includes a plurality of latches coupled to the shelf and adapted to move between an extended position, a retracted position, and an intermediate position disposed between the extended position and the retracted position. In the extended position, the plurality of latches facilitates an engagement of the shelf with the vehicle. In the retracted position, the plurality of latches enables a disengagement of the shelf from the vehicle. In the intermediate position, the plurality of latches facilitates a tilting of the shelf relative to a floor of the vehicle. The shelf structure further includes a plurality of legs adapted to be removably engaged with the plurality of retention structures to facilitate a conversion of the shelf into a table upon disengagement of the shelf from the vehicle.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-11, wherein like numbers indicate the same or corresponding elements throughout the views.

Figure 1:
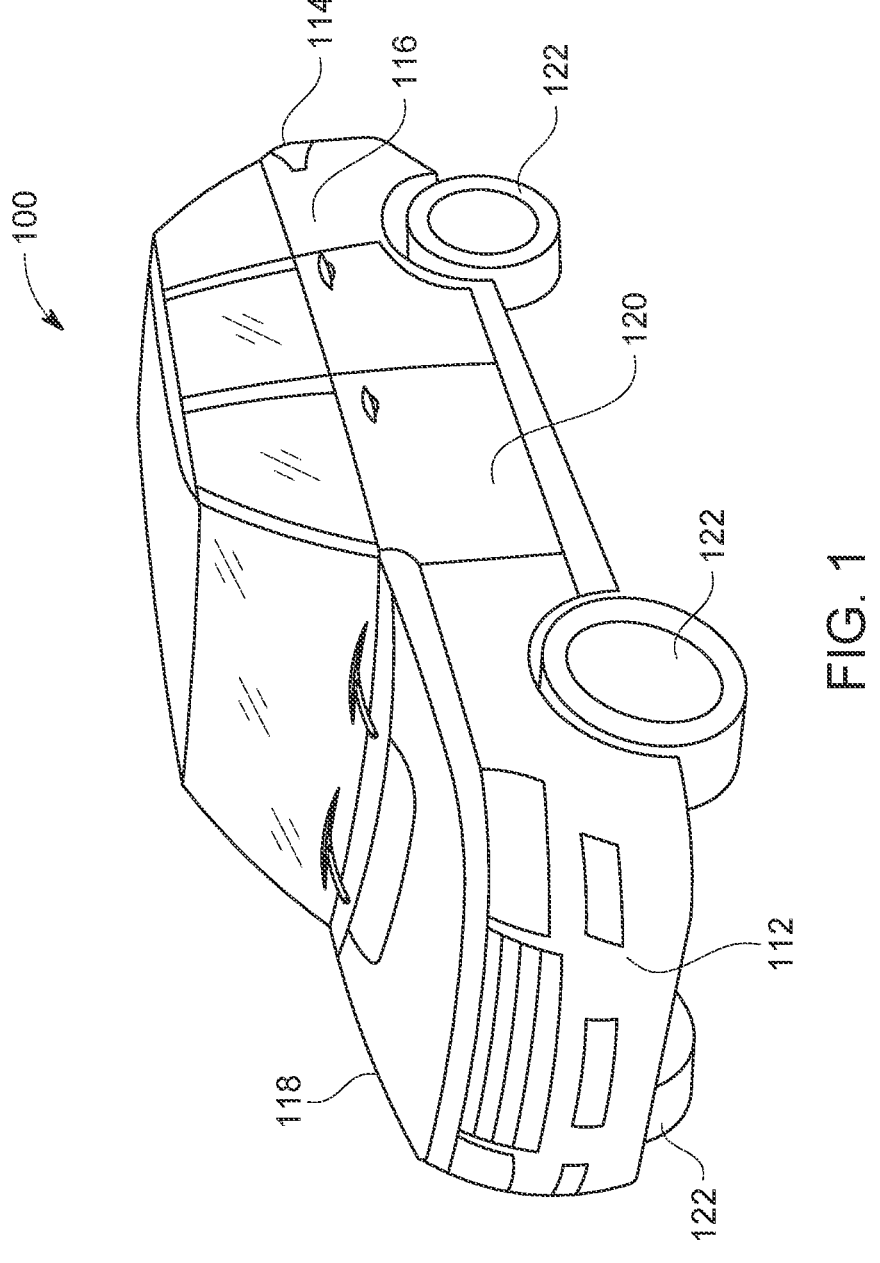
FIG. 1 is a front perspective view of a vehicle, in accordance with one embodiment of the present disclosure.

FIG. 1 illustrates a perspective view of a vehicle, indicated generally at 100, having a cargo shelf assembly 101 (shown in FIG. 2), in accordance with one embodiment of the present disclosure. The vehicle 100 has a vehicle body 120 and includes a front end 112, a rear end 114, a first longitudinal side 116 (hereinafter referred to as a left side 116), and a second longitudinal side 118 (hereinafter referred to as a right side 118). The vehicle body 120 extends from the front end 112 to the rear end 114 and is supported on a plurality of wheels 122. The vehicle 100 is shown as a hatchback, however, the vehicles 100 in accordance with alternative embodiments can comprise any variety of vehicles, including multi-utility vehicles, sport utility vehicles, jeeps, and trucks, etc. The exemplary cargo shelf assembly 101 may partition the vehicle interior vertically (shown in FIG. 2.) increasing cargo management, organization, and utilization; may be easily stored flat on the vehicle floor (shown in FIG. 11) when not in use; and may be converted into a table (shown in FIG. 7) when removed from the vehicle.

Figure 2:
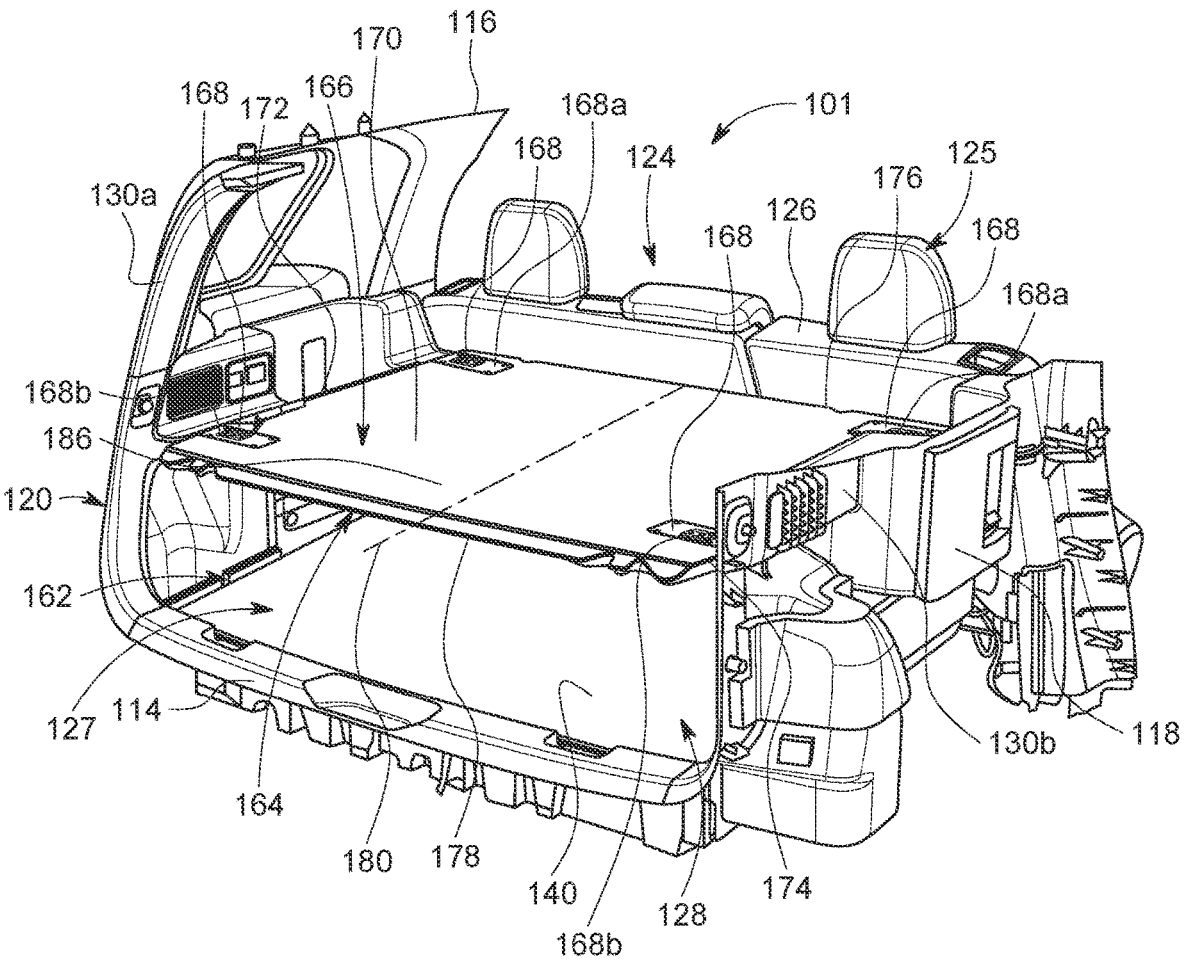
FIG. 2 illustrates a rear portion of the vehicle depicting a shelf structure of a cargo shelf assembly arranged inside a cargo compartment of the vehicle with some of the components of the vehicle removed for clarity, in accordance with one embodiment of the present disclosure.
Figure 3:
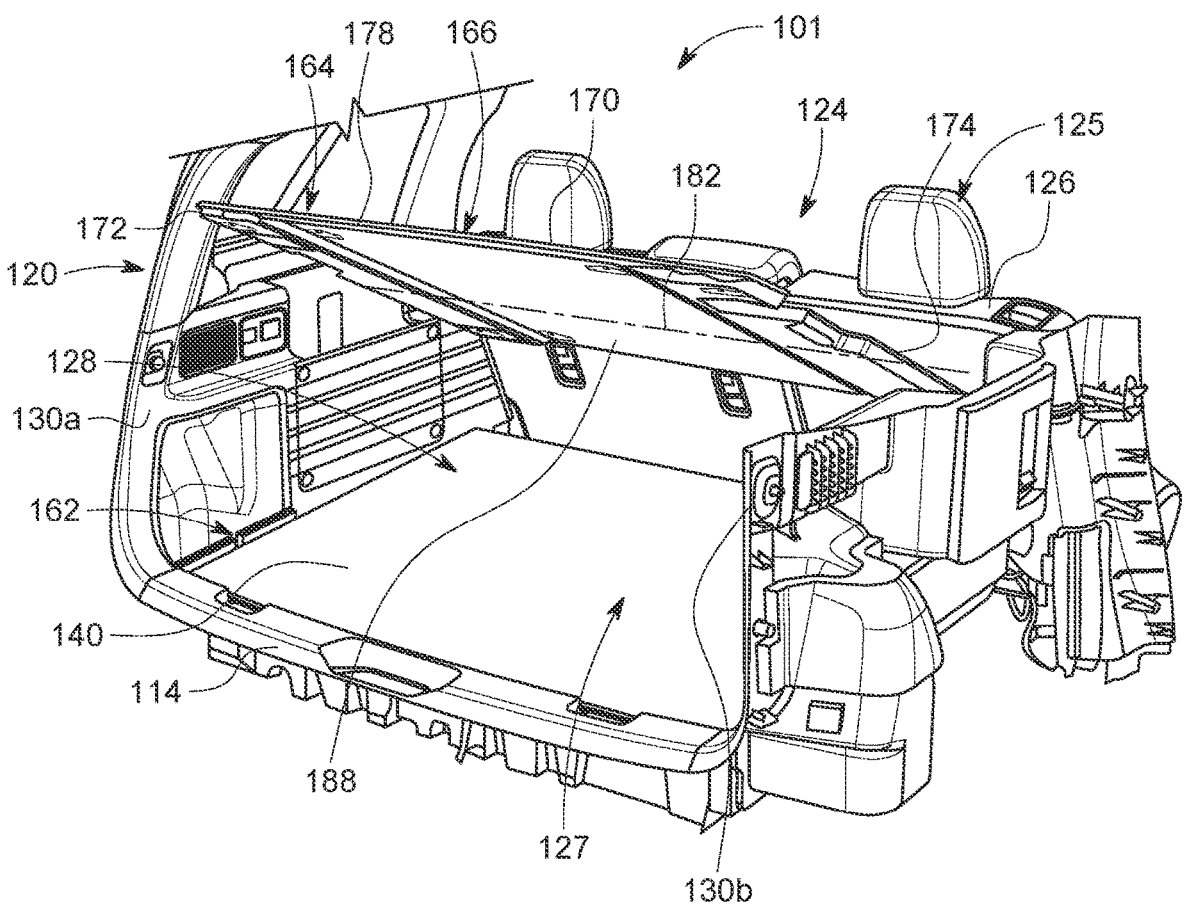
FIG. 3 illustrates the rear portion of the vehicle depicting the shelf structure of the cargo shelf assembly arranged tilted and inside the cargo compartment of the vehicle, in accordance with one embodiment of the present disclosure.

As shown in FIGS. 2 and 3, the vehicle body 120 defines a passenger compartment 124 and a cargo compartment 127 with the cargo shelf assembly 101 arranged inside the cargo compartment 127. The passenger compartment 124 includes a plurality of seats 125 having one or more rear seats 126 to facilitate a seating of a plurality of passengers including a driver inside the vehicle 100. The cargo compartment 127 is arranged at a rear of the seats 126 of the vehicle body 120 and defines a cargo space 128 to enable storage of one or more cargo inside the vehicle 100. The vehicle body 120 also includes a pair of side liners 130a, 130b arranged inside the vehicle body 120 and extending along and mounted to longitudinal sidewalls of a frame of the vehicle body 120. In an exemplary embodiment, the cargo shelf assembly 101 includes a shelf structure 164, which is configured to divide and cover at least a part the cargo space 128 of the cargo compartment 127. The shelf structure 164 is removably coupled to the side liners 130a, 130b (i.e., vehicle body 120) and configured to move between a first position (shown in FIG. 2) and a second position (shown in FIG. 3) when engaged with the side liners 130a, 130b. In the first position, the shelf structure 164 is arranged substantially parallel to a floor 140 of the cargo space 128; while in the second position, the shelf structure 164 is arranged tilted or inclined relative to the horizontally oriented floor 140. When the shelf structure 164 is in the first position, cargo may be placed on top of the shelf structure 164, and when the shelf structure 164 is in the second position, a person may view and access beneath the shelf structure 164.

Figure 4:
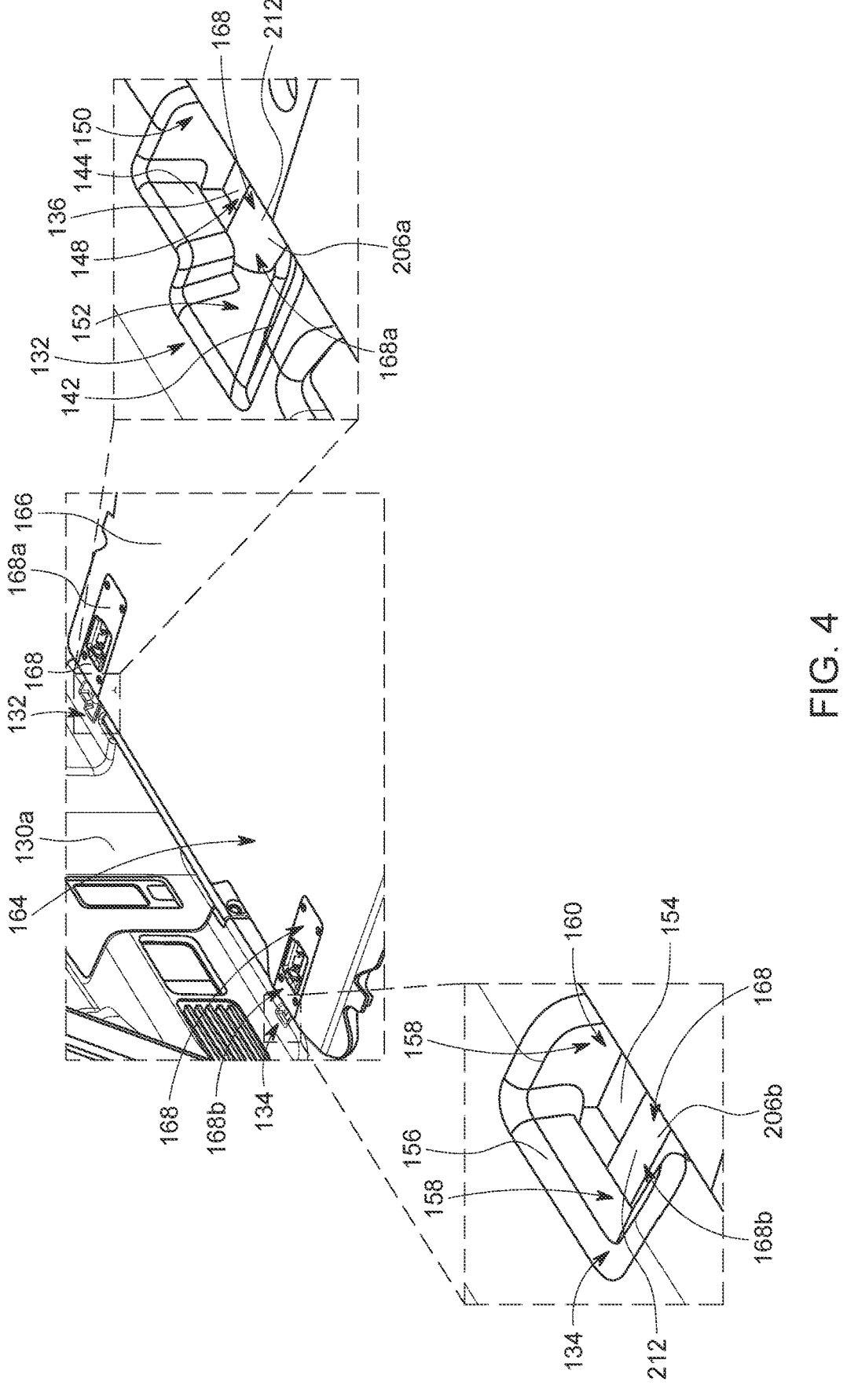
FIG. 4 illustrates an enlarged view of a portion of the vehicle depicting a pair of notches of a side liner of the vehicle and a pair of latches of the shelf structure engaged with the pair of notches, in accordance with one embodiment of the present disclosure.
Figure 5:
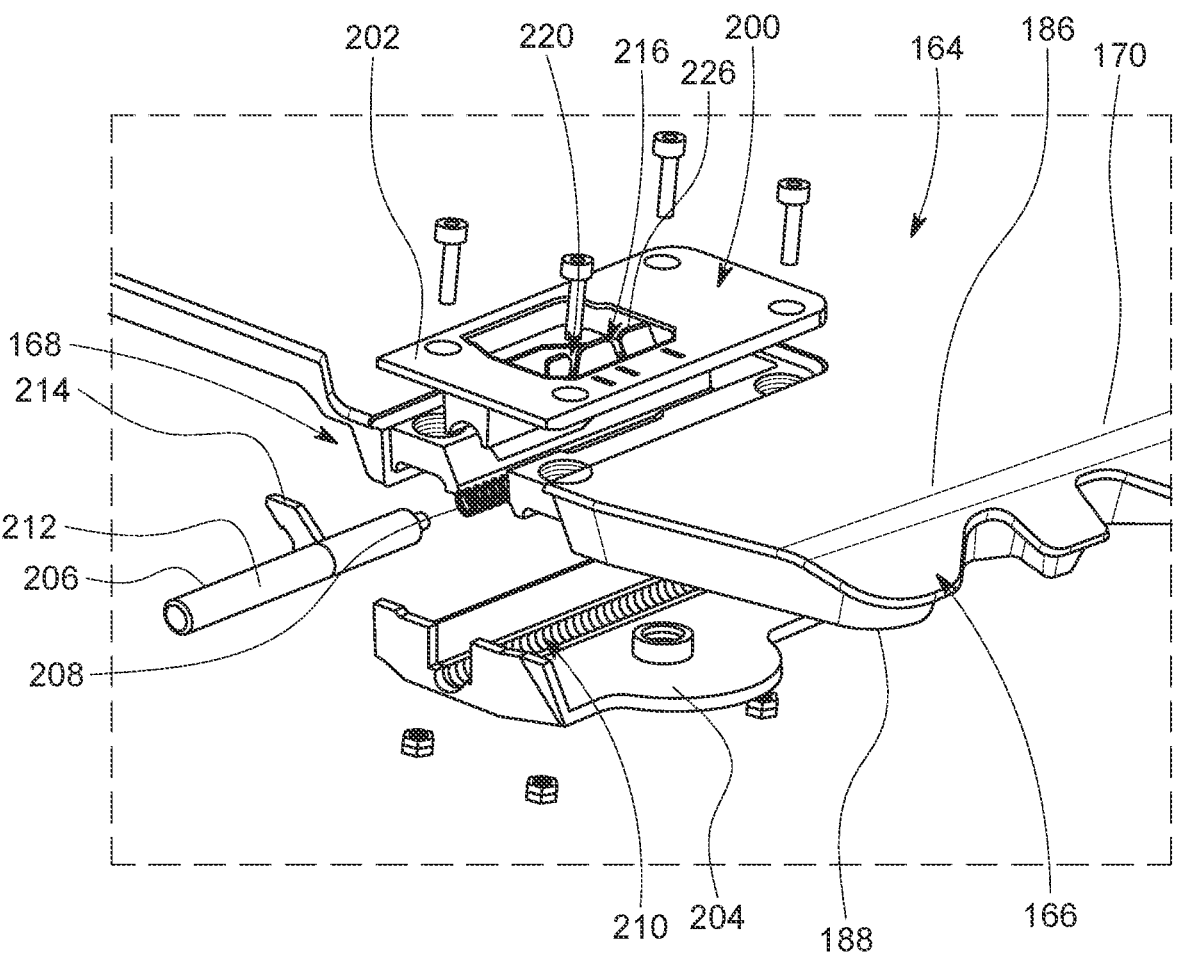
FIG. 5 is an exploded view of a latch assembly of the cargo shelf assembly, in accordance with one embodiment of the present disclosure.

The side liners 130a, 130b extend in the longitudinal direction and are arranged on the opposite longitudinal sides 116, 118 of the vehicle 100. The side liners 130a, 130b extend from the rear end 114 of the vehicle body 120 towards the front end 112 along associated portions of the longitudinal sides 116, 118. It may be appreciated that the two side liners 130a, 130b may be identical in structure, construction, and assembly; therefore, for the sake of clarity and brevity, one side liner 130a is explained in detail. As shown in FIG. 4, the side liner 130a includes a pair of notches, for example, a first notch 132 located proximate to the rear seats 126 and a second notch 134 disposed proximate to the rear end 114 of the vehicle 100. It may be appreciated that the first notches 132 of the two side liners 130a, 130b may be arranged such that the first notches 132 are aligned with each other in the lateral direction. Similarly, the second notches 134 are aligned to each other in the lateral direction.

Moreover, the first notch 132 includes a base wall 136 disposed substantially horizontally and parallel to the floor 140 of the cargo compartment 127 and a tapered wall 142 extending obliquely upwardly from the base wall 136 and rearwardly towards the rear end 114. Additionally, the first notch 132 includes a roof portion 144 arranged facing and opposite to the base wall 136. The roof portion 144 is arranged spaced apart, in a vertical direction, from the base wall 136, and therefore a chamber 148 is defined between the base wall 136 and the roof portion 144. It may be appreciated that a width of the roof portion 144 in the lateral direction is smaller than a width of the base wall 136 in the lateral direction. An opening 150 of the first notch 132 (i.e., chamber 148) is defined along an outer surface of the side liner 130a. A gap 152 may also be defined between the tapered wall 142 and the roof portion 144. Accordingly, the first notch 132 may be formed as a depression extending in the lateral direction from the outer surface of the side liner 130a.

The second notch 134 may be similar to the first notch 132 except that the tapered wall 142 is omitted. Accordingly, the second notch 134 includes a base wall 154, a roof portion 156, a chamber 158, and an opening 160 similar to the base wall 136, the roof portion 144, the chamber 148, and the opening 150 of the first notch 132. Alternatively, the second notch 134 may be identical to the first notch 132 and includes a tapered wall similar to the tapered wall 142 of the first notch 132. Additionally, the side liner 130a includes one or more slots 162 (shown in FIG. 2) arranged proximate to and vertically above the floor 140 of the cargo compartment 127, and located proximate to the rear end 114 of the vehicle 100. The slot 162 facilitates the storage of the shelf structure 164 of the cargo cover assembly 101 in a storage position on the floor 140 of the vehicle 100 (shown in FIG. 11).

As shown in FIGS. 2, the shelf structure 164 includes a shelf 166 that may be rectangular or square in shape and a plurality of latch assemblies 168 coupled to the shelf 166 and adapted to be engaged with the plurality of notches 132, 134 to enable the removable engagement of the shelf structure 164 with the vehicle body 120. The shelf structure 164 may also include a plurality of retention structures 190 on the shelf 166 and adapted to be removably engaged with a plurality of legs 300 (shown in FIGS. 7 and 8) to facilitate a conversion of the shelf 166 into a table upon disengagement of the shelf 166 from the vehicle.

The shelf 166 extends longitudinally and laterally inside the cargo compartment 127 when engaged with the vehicle body 120 and includes a panel or body 170 having a pair of longitudinal sides 172, 174 extending along longitudinal sides 116, 118 of the vehicle 100 and a pair of lateral sides 176, 178 extending in the lateral direction of the vehicle 100. When engaged with the side liners 130a, 130b, a first lateral side 176 of the shelf 166 is arranged proximate to the rear seats 126, while a second lateral side 178 of the shelf 166 is arranged proximate to the rear end 114 of the vehicle 100.

The plurality of latch assemblies 168 include a pair of first latch assemblies 168a coupled to the longitudinal sides 172, 174 of the shelf 166 and arranged opposite to each other. The pair of first latch assemblies 168a are arranged proximate to the first lateral side 176 of the shelf 166 and are arranged proximate to the rear seats 126 of the vehicle 100. Moreover, the plurality of latch assemblies 168 includes a pair of second latch assemblies 168b coupled to the shelf 166 and arranged along the opposite longitudinal sides 172, 174 of the shelf 166. The pair of second latch assemblies 168b are arranged proximate to the second lateral side 178 of the shelf 166 and are arranged proximate to the rear end 114 of the vehicle 100. It may be appreciated that the shelf structure 164 may be symmetrical about its central longitudinal axis 180 (shown in FIG. 2) and central lateral axis 182 (shown in FIG. 3), and the latch assemblies 168 may be identical in structure, construction and assembly with the shelf 166; therefore, for the sake of clarity and brevity, a structure, a construction, a function, and an assembly of only one latch assembly 168 are described in detail.

As shown in FIGS. 5 and 6A to 6C, the latch assembly 168 includes a housing 200 removably coupled to the body 170 of the shelf 166 and having an upper member 202 and a lower member 204, a latch 206 arranged at least partially inside the housing 200, and a biasing member 208 engaged with the latch 206 and disposed inside the housing 200. The upper member 202 is coupled to an upper surface 186 of the body 170 of the shelf 166, while the lower member 204 is coupled to a bottom surface 188 of the body 170 of the shelf 166, defining an elongated channel 210 therebetween. As shown, the elongated channel 210 extends in the lateral direction, and the latch 206 is movably arranged inside the channel 210 and configured to extend and retract between an extended position and retracted position in the lateral direction relative to the housing 200. Moreover, the latch 206 is adapted to be displaced and held at an intermediate position between the extended position and the retracted position. Although the upper member 202 and the lower member 204 are shown and contemplated to be removably coupled to the shelf 166, however, it may be appreciated that the upper member 202 and/or the lower member 204 may be integrally formed with the shelf 166 and may be features or components of the shelf 166.

The latch 206 includes a rod 212 movably arranged inside the channel 210 and a handle 214 coupled to the rod 212 and extending inside a cavity 216 of the upper member 202. The handle 214 enables a user to hold the latch 206 and to move the latch 206 between the extended position, the intermediate position, and the retracted position. In the extended position, a length of the rod 212 that extends outwardly of the housing 200, in the lateral direction, is larger than a length of the rod 212 extending outwardly of the housing 200 in the intermediate position. In the retracted position, the rod 212 is either completely arranged inside the elongated channel 210 or a length of the rod 212 that extends outwardly of the housing 200 is smallest relative to the extension of the rod 212 outside the housing 200 in both the extended position and the intermediate position.

It may be appreciated that in the assembly of the shelf structure 164 with the vehicle body 120 and in the extended position of each of the first latch assemblies 168a, a front portion of the rod 212 is arranged inside the chamber 148 of the associated first notch 132 and underneath the roof portion 144, thereby engaging the shelf structure 164 with the sideliner 130a or the side liner 130b and preventing the disengagement of the latch 206 from the side liner 130a or the side liner 130b. In the retracted position, the latch 206 is retracted inside the housing 200 such that the front portion of the rod 212 is arranged outside the first notch 132. In the intermediate position, the front portion of the rod 212 is arranged inside the chamber 148 of the notch 132, and away from the roof portion 144 such that the rod 212 may move out of the first notch 132 (i.e., chamber 148) without interfering with the roof portion 144, upon vertical movement of the shelf structure 164. Likewise, in the assembly of the shelf structure 164 with the vehicle body 120 and in the extended position of each of the second latch assemblies 168b, a front portion of the rod 212 is arranged inside the chamber 158 of the associated second notch 134 and underneath the roof portion 156, thereby engaging the shelf structure 164 with the sideliner 130a or the side liner 130b and preventing the disengagement of the latch 206 from the side liner 130a or the side liner 130b. In the retracted position, the latch 206 is retracted inside the housing 200 such that the front portion of the rod 212 is arranged outside the second notch 134. In the intermediate position, the front portion of the rod 212 is arranged inside the chamber 158 of the notch 134, and away from the roof portion 156 such that the rod 212 moves out of the first notch 134 (i.e., chamber 158) without interfering with the roof portion 156, upon vertical movement of the shelf structure 164. Correspondingly, in the storage of the shelf structure 164 with the vehicle body 120 and in the extended position or intermediate position of at least one second latch assemble 168b, a front portion of the rod 212 is arranged inside the slot 162, thereby engaging the shelf structure 164 with the sideliner 130a or the side liner 130b and preventing the disengagement of the latch 206 from the side liner 130a or the side liner 130b.

Figure 6A:
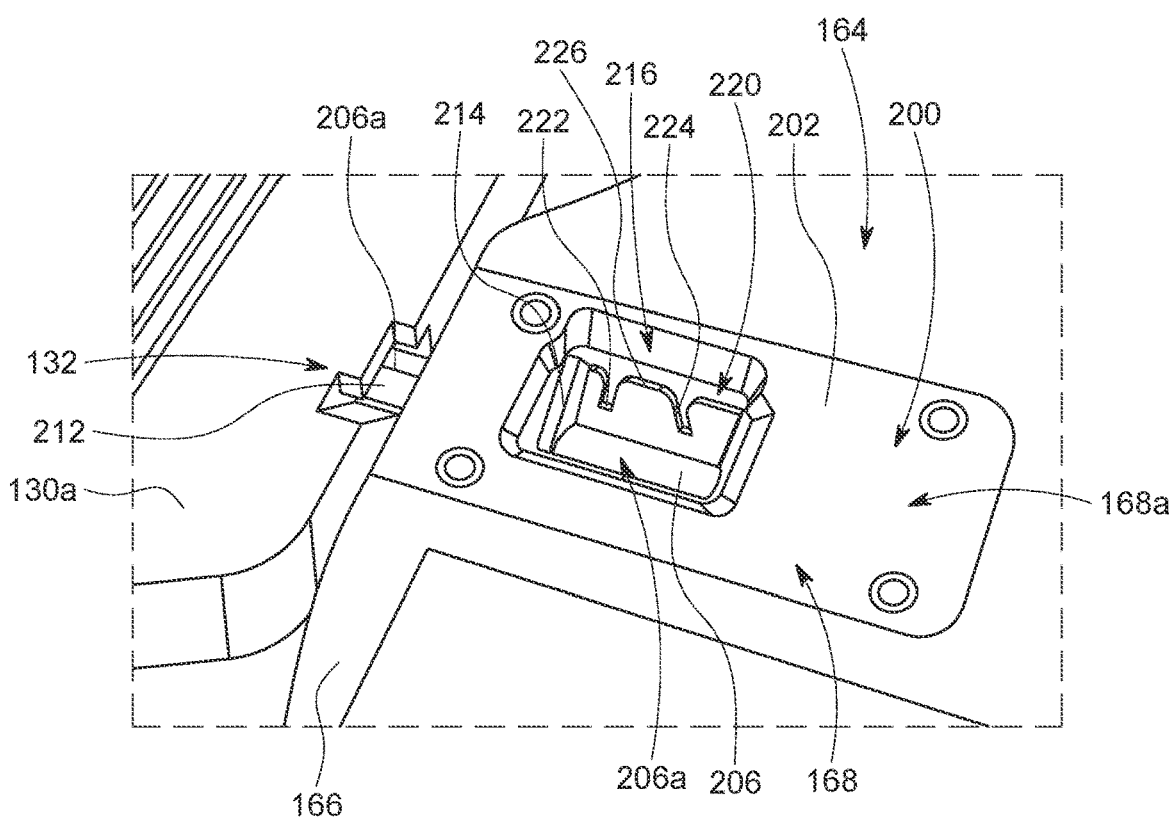
FIG. 6A illustrates a latch of the latch assembly arranged in an extended position, in accordance with one embodiment of the present disclosure.
Figure 6B:
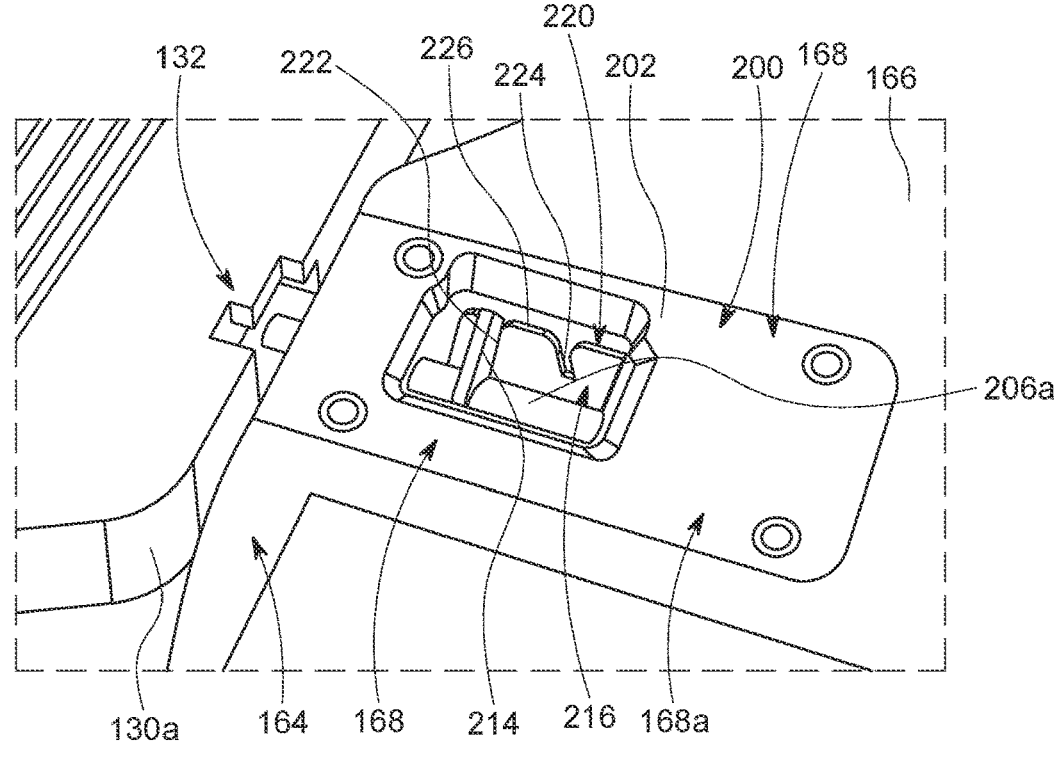
FIG. 6B illustrates the latch of the latch assembly of FIG. 6A arranged in an intermediate position, in accordance with one embodiment of the present disclosure.
Figure 6C:
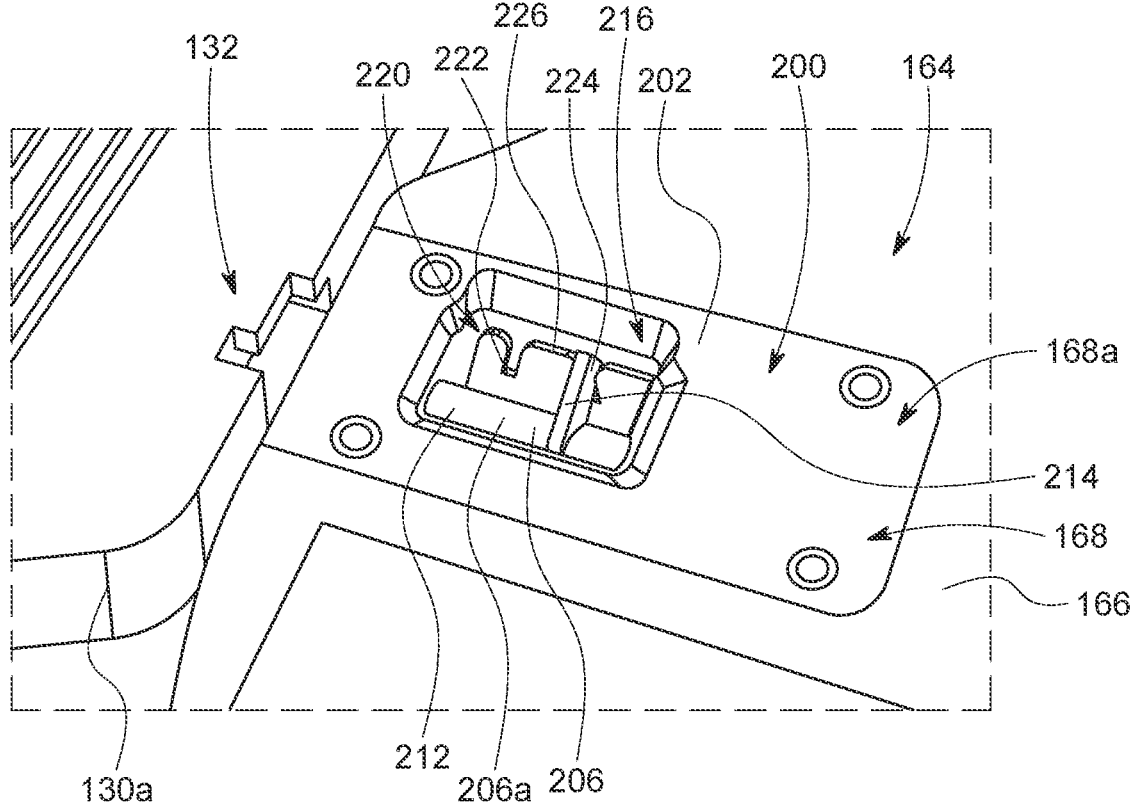
FIG. 6C illustrates the latch of the latch assembly of FIG. 6A arranged in a retracted position, in accordance with one embodiment of the present disclosure.

Moreover, the latch 206 may be biased to the extended position by the biasing member 208, and is moved or displaced to the intermediate and retracted positions by moving the latch 206 against the biasing force of the biasing member 208. Accordingly, to retain and hold the latch 206 at the intermediate position and the retracted position, the housing 200 (i.e., the upper member 202) includes a stopper structure 220 extending inside the cavity 216 and having a first indent 222 and a second indent 224 as shown in FIGS. 6A to 6C. The latch 206 is engaged with the first indent 222 and the second indent 224 in the intermediate position and the retracted position, respectively. As shown, the handle 214 of the latch 206 is inserted inside the first indent 222 to retain and hold the latch 206 (i.e., rod 212) at the intermediate position, while the handle 214 is inserted inside the second indent 224 to retain and hold the latch 206 at the retracted position. As shown, the first indent 222 and the second indent 224 are defined by the cut-outs defined in a vertically extending wall 226 of the upper member 202. In an embodiment, the wall 226 (i.e., the stopper structure 220) may be separate from the upper member 202 and may be integrally formed with the shelf 166.

Figure 7:
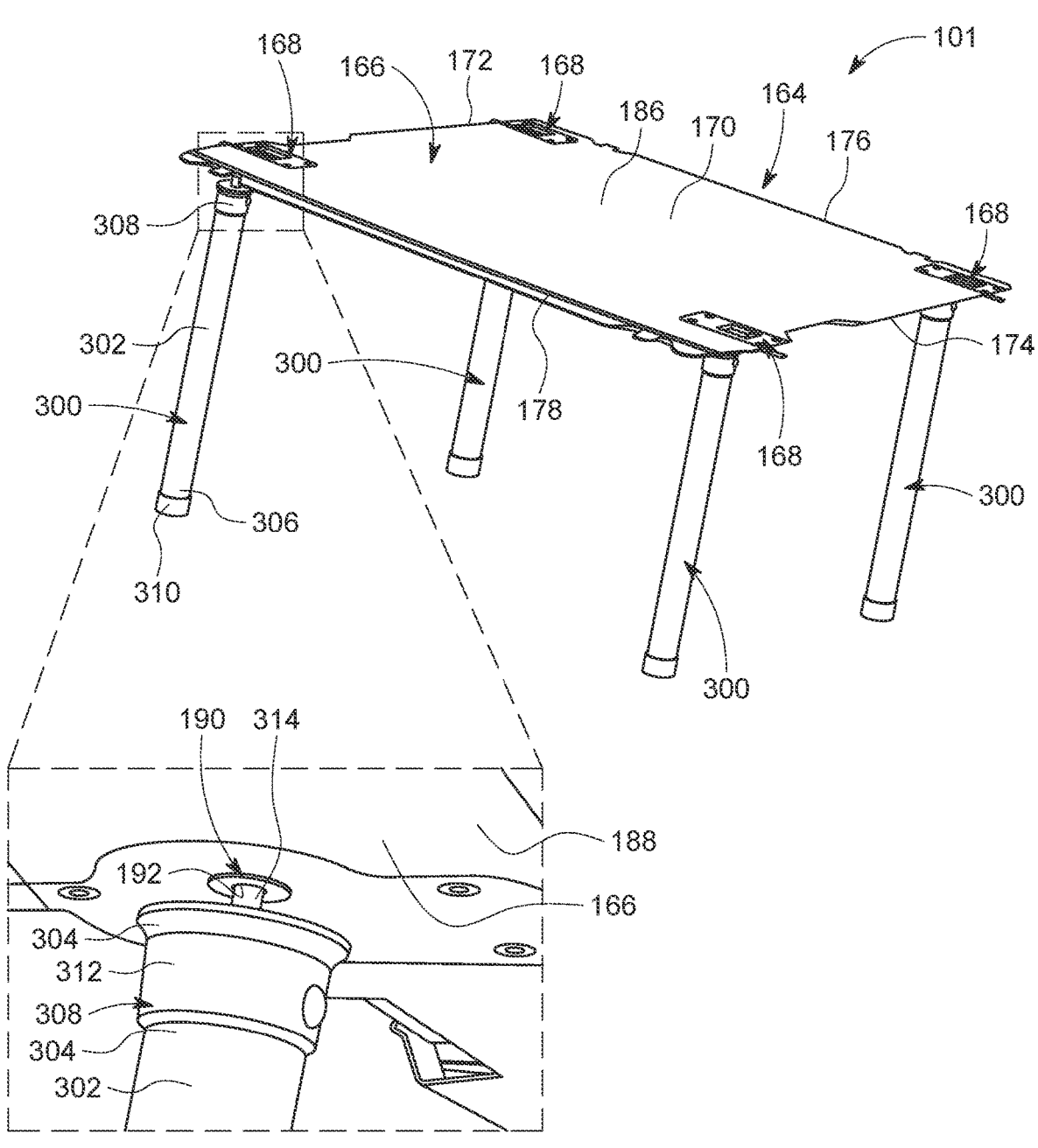
FIG. 7 illustrates a perspective view of the cargo shelf assembly having a plurality of legs coupled to the shelf and arranged as a table, in accordance with one embodiment of the present disclosure.
Figure 8:
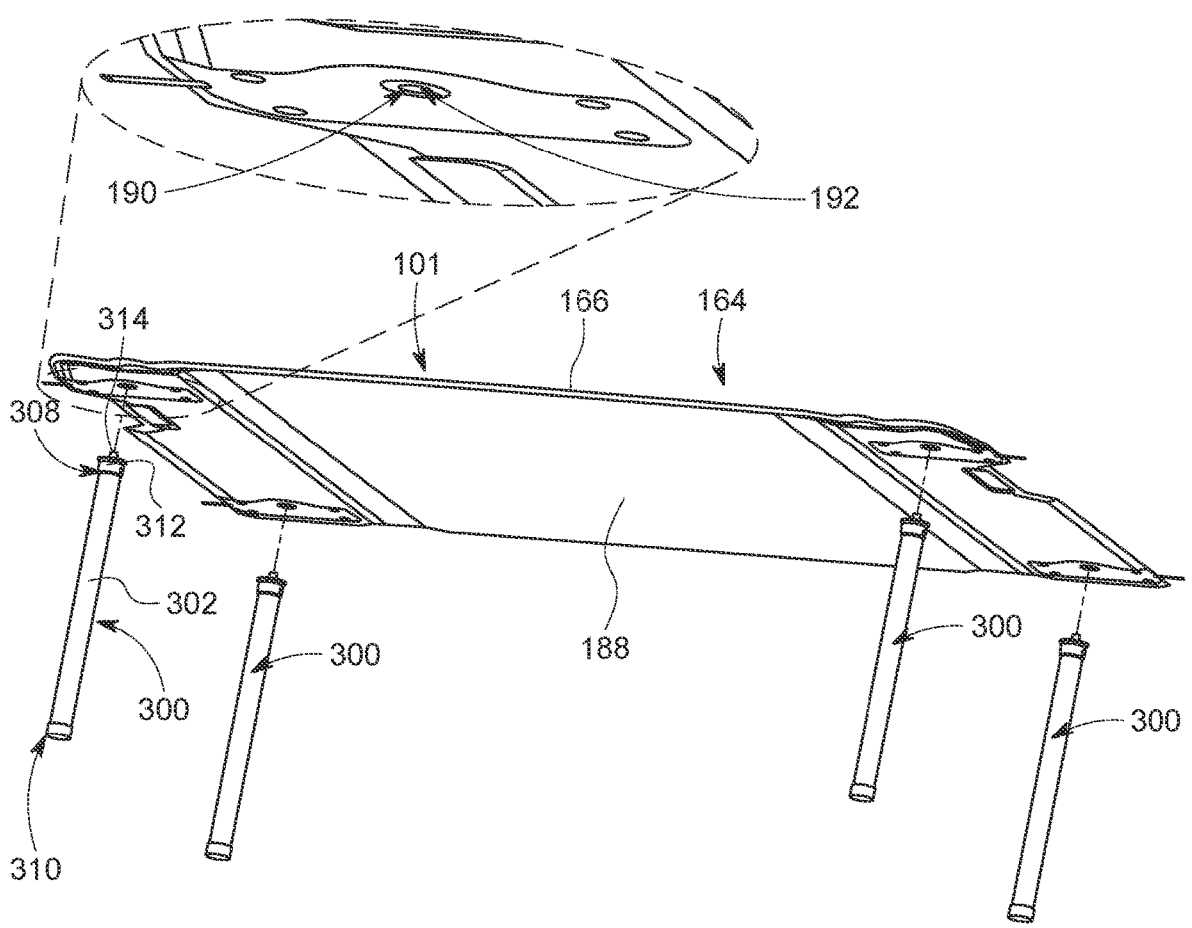
FIG. 8 illustrates an exploded view of the cargo shelf assembly of FIG. 7 depicting the plurality of legs disengaged from the shelf, in accordance with one embodiment of the present disclosure.
Figure 9:
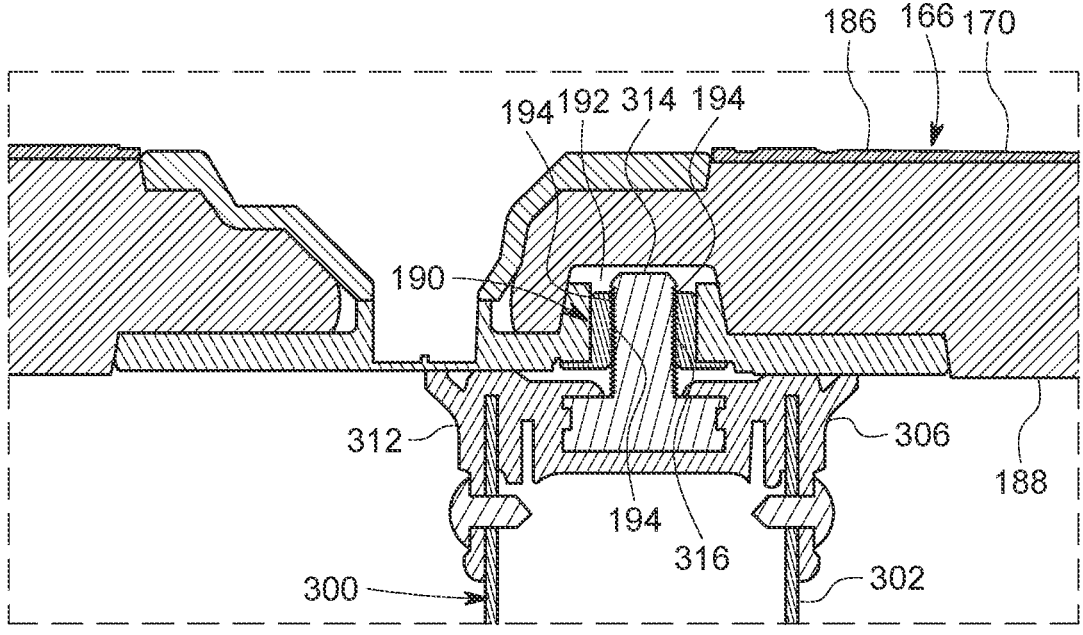
FIG. 9 depicts a sectional view of a portion of the cargo shelf assembly of FIG. 7 depicting a protrusion of the leg arranged inside a groove of the shelf, in accordance with one embodiment of the present disclosure.

Referring to FIGS. 7 to 9, the shelf 166 includes a plurality of retention structures 190, for example, four retention structures 190, to facilitate a conversion of the cargo shelf assembly 101 into a table. Each retention structure 190 includes a groove 192 extending inwardly from the bottom surface 188 of the body 170 of the shelf 166. The groove 192 includes internal threads 194 (shown in FIG. 9) to enable a removable coupling of a plurality of legs 300, for example four legs 300, of the cargo shelf assembly 101 with the shelf 166 to enable conversion of the shelf 166 (i.e., shelf structure 164) into the table.

Figure 10:
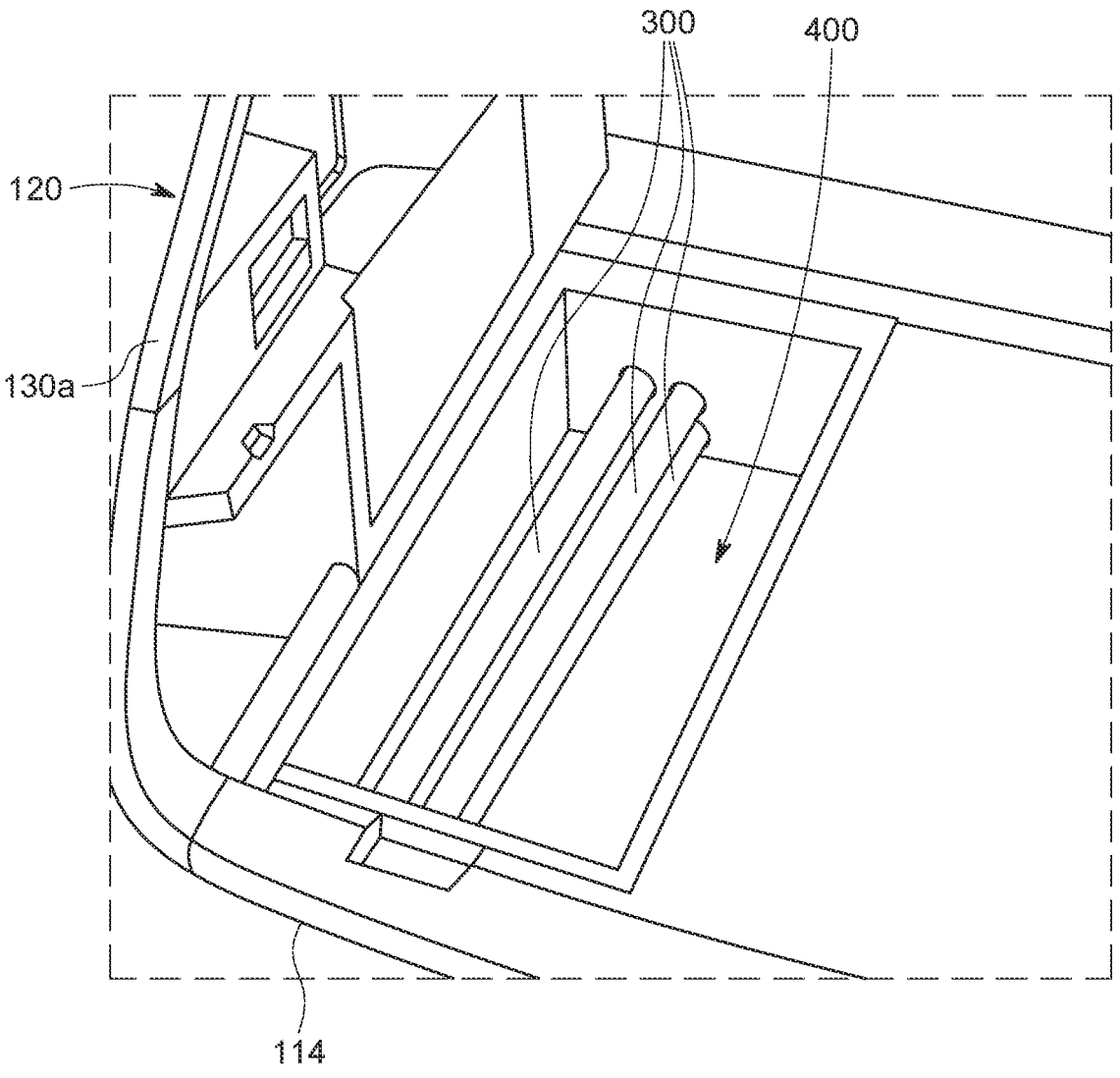
FIG. 10 depicts a perspective view of a rear portion of the vehicle depicting the plurality of legs of stored inside a storage chamber disposed beneath a floor of the vehicle, in accordance with one embodiment of the present disclosure.

As shown, each of the plurality of legs 300 includes an elongated tube 302 having an upper end 304 and a lower end 306, an upper cap 308 arranged at the upper end 304 of the tube 302, and a lower cap 310 arranged at the lower end 306 of the tube 302 and removably coupled to the tube 302. The upper cap 308 includes a body potion 312 removably engaged with the tube 302 and a protrusion 314 extending in a longitudinal direction from the body portion 312 and away from the tube 302. The protrusion 314 is arranged inside the groove 192, in an assembly of the plurality of legs 300 with the shelf 166, to convert the shelf structure 164 into a table. To facilitate the removable and secure connection of the plurality of legs 300 with the shelf 166, the protrusion 314 may include external threads 316 (shown in FIG. 9) adapted to engage with the internal threads 194 of the groove 192. Although the threaded engagement of the legs 300 with the retention structures 190 is shown and contemplated, it may be appreciated the protrusion 314 may be press fitted inside the groove 192, and in such case, the internal threads 194 of the groove 192 and the external threads 316 of the protrusion 314 may be omitted. Additionally, as shown in FIG. 10, the vehicle 100 may include a storage chamber 400 disposed underneath the floor 140 of the cargo compartment 127 to facilitate a storage of the legs 300.

A method for installation of the cargo shelf assembly 101 to the vehicle body 120 and use of the cargo shelf assembly 101 inside the vehicle 100 is now described. It may be appreciated that for case of description, the latches 206 associated with the first latch assemblies 168a are referred to as first latches 206a, while the latches 206 associated with the second latch assemblies 168b are referred to as second latches 206b. For installation of the shelf structure 164 inside the cargo compartment 127, the user removes the legs 300 from the shelf structure 164, and moves or displaces the first latches 206a to the extended position, as shown in FIG. 6A. The user also moves the second latches 206b to the intermediate or retracted position, as shown in FIGS. 6B and 6C. Thereafter, the user slides the shelf structure 164 towards the rear seat 126 such that the rods 212 of the first latches 206a enters the chambers 148 of the first notches 132 through the gaps 152 defined between the roof portion 144 and the tapered walls 142, and the rods 212 of the first latches 206a are arranged inside the chambers 148 and underneath the roof portions 144. Thereafter, if the second latches 206b are in the intermediate position, the user lowers the shelf structure 164 down, such that the rods 212 of the second latches 206b contact the base wall 154 of the second notches 134, and then the user inserts the rods 212 of the second latches 206b underneath the roof portions 156 by moving the second latches 206b to the extended position. If the second latches 206b are in the retracted position, the user lowers the shelf structure 164 down, such that rods 212 of the second latches 206b are placed adjacent to the base wall 154 of the second notches 134, and the user inserts the rods 212 of the second latches 206b inside the chambers 158 of the second notches 134 and underneath the roof portions 156 by moving the second latches 206b to the extended position. In this manner, the shelf structure 164 is engaged with the side liners 130a, 130b and disposed in the first position inside the vehicle 100, dividing and covering at least a part of the cargo space 128 from above, as shown in FIG. 2. Also, the removed legs 300 may be stored inside the storage chamber 400, as shown in FIG. 10.

For moving the shelf structure 164, and hence, the shelf 166 to a tilted position (i.e., second position, as shown in FIG. 3), the user moves the second latches 206b to the intermediate position, thereby moving the rods 212 away from the underneath the roof portions 144 of the second notches 134, while still keeping the rods 212 on the base wall 154 of the second notches 134. Thereafter, the user tilts the shelf 166 by moving the second lateral side 178 of the shelf 166 upwardly, while keeping the first latches 206a arranged inside the first notches 132 and in the extended position, preventing the disengagement of the shelf structure 164 from the side liners 130a, 130b during tilting. As the second latches 206b are arranged in the intermediate positions, the roof portions 156 of the second notches 134 will not interfere with the rods 212 during tilting of the shelf structure 164 (i.e., shelf 166). The user may arrange the shelf structure 164 back to the first position by moving the shelf 166 downwardly, while keeping the second latches 134 at the intermediate position. At the first position, the rods 212 of the second latches 206b contact the base wall 154 of the second notches 134. Subsequently, the user moves the second latches 206b to the extended position to securely engage the shelf 166 (i.e., shelf structure 164) with the side liners 130a, 130b.

For converting the cargo shelf assembly 101 into a table, the user disengages the shelf structure 164 from the side liners 130a, 130b and moves the shelf structure 164 outwardly of the vehicle 100. For so doing, the user moves the second latches 206b to either the retracted position or the intermediate position, and lifts the shelf structure 164 upwardly such that rods 212 of the second latches 206b come out of the second notches 134. Subsequently, the user pulls the shelf structure 164 in rearward direction. In response to the pulling of the shelf structure 164 in the rearward direction, the rods 212 of the first latches 206a slides along the tapered wall 142 of the first notches 132 and comes out of the chambers 148 of the first notches 132 through the gaps 152 defined between the tapered walls 142 and the roof portions 144, thereby facilitating disengagement of the shelf structure 164 from the side liners 130a, 130b of the vehicle 100. Upon disengagement of the latches 206 from the side liners 130a, 130b, the shelf structure 164 and hence the shelf 166 is moved outwardly out of the vehicle 100. In this manner, the shelf structure 164, and hence the shelf 166, is disengaged from the side liners 130a, 130b without operating the first latches 206a and keeping the first latches 206a to the extended position. Thereafter, the plurality of legs 300 are removed from the storage chamber 400 and are engaged with the shelf structure 164. For so doing, the protrusion 314 of each of the plurality of legs 300 is inserted into the associated grooves 192 and each of the plurality of legs 300 is rotated in a predefined direction to enable the engagement of each of the plurality of legs 300 with the shelf structure 164.

Figure 11:
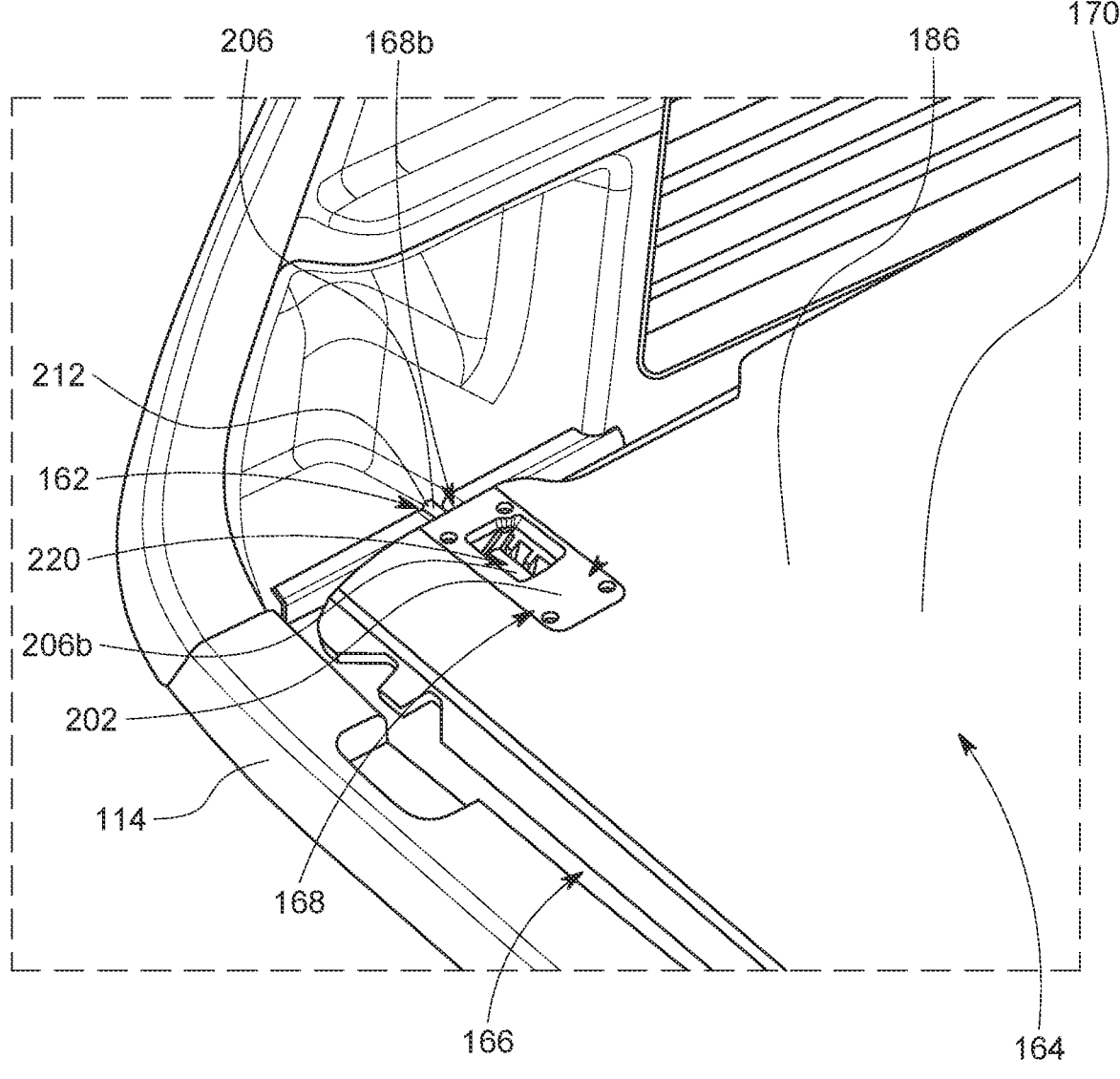
FIG. 11 depicts a perspective view of a rear portion of the vehicle depicting the shelf structure arranged on the floor of the vehicle, in accordance with one embodiment of the present disclosure.

Further, for storing the shelf structure 164 inside the cargo compartment 127, the shelf structure 164 and hence the shelf 166 is placed on the floor 140 of the vehicle 100, and the second latches 206b are moved either to the extended positions or the intermediate positions such that the rods 212 of the second latches 206b extend inside the slots 162, as shown in FIG. 11, thereby securing the shelf structure 164, and hence the shelf 166 on the floor 140 of the vehicle 100, as shown in FIG. 11.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A cargo shelf assembly for a vehicle, the cargo shelf assembly comprising:
   a shelf adapted to be removably engaged with the vehicle to divide at least a part of a cargo space of the vehicle;
   a plurality of latches coupled to the shelf and adapted to move between an extended position and a retracted position, wherein in the extended position, the plurality of latches facilitates an engagement of the shelf to the vehicle, and in the retracted position, the plurality of latches enables a disengagement of the shelf from the vehicle;

a plurality of retention structures on the shelf to facilitate a conversion of the shelf into a table upon removal of the shelf from the vehicle; and a plurality of stopper structures to retain the plurality of latches in one or more positions.

2. The cargo shelf assembly of claim 1, wherein each of the plurality of latches is configured to move to an intermediate position disposed between the extended position and the retracted position, wherein one or more of the plurality of latches are moved to the intermediate position to tilt the shelf relative to a floor of the vehicle.

3. The cargo shelf assembly of claim 1 further comprising a plurality of legs adapted to be removably engaged with the plurality of retention structures to facilitate the conversion of the shelf into the table.

4. The cargo shelf assembly of claim 3, wherein each of the plurality of retention structures includes a groove and each of the plurality of legs includes a protrusion adapted to be inserted inside the groove to enable the engagement of the plurality of legs with the shelf.

5. The cargo shelf assembly of claim 4, wherein each groove includes internal threads and each protrusion includes external threads adapted to removably engage with the internal threads of the groove.

6. The cargo shelf assembly of claim 1, wherein each of the plurality of latches is biased to the extended position, wherein each of the stopper structures includes a first indent and a second indent to retain an associated latch of the plurality of latches in an intermediate position and the retracted position, respectively.

7. A vehicle, comprising:

a vehicle body defining a cargo space for storing one or more cargo;

a shelf adapted to be removably engaged with the vehicle to divide at least a part of the cargo space of the vehicle and including a plurality of retention structures to facilitate a conversion of the shelf into a table upon removal of the shelf from the vehicle body; and a plurality of latches adapted to move between an extended position and a retracted position and coupled to the shelf, wherein in the extended position, the plurality of latches engages the shelf with the vehicle body, wherein the shelf further includes a plurality of stopper structures to retain the plurality of latches in one or more positions.

8. The vehicle of claim 7, wherein the vehicle body includes a pair of side liners defining a plurality of notches to receive the plurality of latches arranged in the extended position.

9. The vehicle of claim 8, wherein the plurality of latches includes a pair of first latches aligned in a lateral direction, and the plurality of notches includes a pair of first notches aligned in the lateral direction and the first notches include tapered walls to enable a removal of the pair of first latches from the pair of first notches in response to sliding of the shelf in a longitudinal direction towards a rear end of the vehicle.

10. The vehicle of claim 7, wherein the vehicle body defines at least one slot arranged proximate to a floor of the vehicle to receive a latch of the plurality of latches to restrict a movement of the shelf when the shelf is stored inside a cargo compartment of the vehicle.

11. The vehicle of claim 7, wherein each of the plurality of latches is configured to move to an intermediate position disposed between the extended position and the retracted position, wherein one or more of the plurality of latches are moved to the intermediate position to tilt the shelf relative to a floor of the vehicle.

12. The vehicle of claim 7 further comprising a plurality of legs adapted to be removably engaged with the plurality of retention structures to facilitate the conversion of the shelf into the table.

13. The vehicle of claim 12, wherein each of the plurality of retention structures includes a groove and each of the plurality of legs includes a protrusion adapted to be inserted inside the groove to enable the engagement of the plurality of legs with the shelf.

14. The vehicle of claim 7, wherein each of the stopper structures includes a first indent to retain an associated latch of the plurality of latches in an intermediate position and a second indent to retain the associated latch in one of the extended position or the retracted position.

15. A shelf structure for a vehicle, the shelf structure comprising:

a shelf adapted to be removably engaged with the vehicle to divide at least a part of a cargo space of the vehicle; and a plurality of latches coupled to the shelf and adapted to move to an extended position, a retracted position, and an intermediate position disposed between the extended position and the retracted position, wherein in the extended position, the plurality of latches facilitates an engagement of the shelf with the vehicle, in the retracted position, the plurality of latches enables a disengagement of the shelf from the vehicle, and in the intermediate position, the plurality of latches facilitates a tilting of the shelf relative to a floor of the vehicle.

16. The shelf structure of claim 15, wherein the shelf includes a plurality of retention structures adapted to engage a plurality of legs to facilitate a conversion of the shelf into a table upon disengagement of the shelf from the vehicle.

17. The shelf structure of claim 16, wherein each of the plurality of legs includes a protrusion and each of the plurality of retention structures includes a groove adapted to receive the protrusion to enable the engagement of the plurality of legs with the shelf.

18. The shelf structure of claim 15 further comprising a plurality of stopper structures to retain the plurality of latches in one or more positions, wherein each of the stopper structures includes a first indent to retain an associated latch of the plurality of latches in an intermediate position, and a second indent to retain the associated latch in one of the extended position or the retracted position.

19. A vehicle comprising:

a vehicle body defining a cargo space for storing one or more cargo;

a shelf adapted to be removably engaged with the vehicle to divide at least a part of the cargo space of the vehicle; and a plurality of latches adapted to move between an extended position and a retracted position and coupled to the shelf, wherein in the extended position, the plurality of latches engages the shelf with the vehicle body, wherein the vehicle body includes a pair of side liners defining a plurality of notches to receive the plurality of latches arranged in the extended position, and wherein the plurality of latches includes a pair of first latches aligned in a lateral direction, the plurality of notches includes a pair of first notches aligned in the lateral direction, and the first notches include tapered walls to enable a removal of the first latches from the first notches in response to sliding of the shelf in a longitudinal direction towards a rear end of the vehicle.

\* \* \* \* \*